United States Patent [19]

Lin

[11] Patent Number: 5,677,831

[45] Date of Patent: Oct. 14, 1997

[54] EXPANDABLE UNINTERRUPTIBLE POWER SUPPLY SYSTEM

[76] Inventor: Jung-Hui Lin, 4F., No. 17, Alley 255, Fu-Yuan St., Taipei, Taiwan

[21] Appl. No.: 619,337

[22] Filed: Mar. 21, 1996

[51] Int. Cl.⁶ .................................................. H02M 3/335
[52] U.S. Cl. .................................................. 363/24; 363/56
[58] Field of Search ................................ 363/17, 24, 132, 363/50, 56; 307/82

[56] References Cited

U.S. PATENT DOCUMENTS 4,679,130  7/1987  Moscovici ................................ 363/17
5,285,372  2/1994  Huynh et al. .......................... 363/132

Primary Examiner—Peter S. Wong
Assistant Examiner—Rajnikant B. Patel
Attorney, Agent, or Firm—Beveridge, DeGrandi, Weilacher & Young,LLP

[57] ABSTRACT

An uninterrupted power supply system including a square wave oscillator, a square wave drive, a negative wave drive, a first bridge drive, a second bridge drive, a bridge circuit, a R/C low pass filter, an overload protection circuit, a high-voltage generator, and a full-wave rectifier, wherein the bridge circuit consists of pairs of oxide metal field effect transistors (insulated-gate semiconductors) respectively connected by bridging for the conversion of DC power supply into AC power supply; the high-voltage generator and the bridge circuit are mounted on an expansion card so that the output power of the system can be expanded by installing additional expansion cards.

9 Claims, 6 Drawing Sheets

5,677,831

EXPANDABLE UNINTERRUPTIBLE POWER SUPPLY SYSTEM

BACKGROUND OF THE INVENTION

The present invention relates to uninterrupted power supply systems, and relates more particularly to such an uninterrupted power supply system in which oxide metal field effect transistors (insulated-gate semiconductors) are used for power output and respectively connected in pair by bridging for the conversion of DC power supply into AC power supply; sub-circuits are made in the form of an expansion card so that output power can be expanded by installing additional expansion cards.

Regular uninterrupted power supply systems commonly include two types, namely, the ON LINE type (which continuously converts energy 24 hours a day) and the OFF LINE type (which is constantly maintained at the charging mode and works only when power fails). These conventional uninterrupted power supply systems commonly use a transformer (see FIG. 6) for power output. The transformer converts low voltage signal into high voltage signal so that DC power supply can be changed to AC120 V/60 Hz). This design is inexpensive. However, the transformer does not allow the output power of the uninterrupted power supply system to be expanded because of the limitations of its impedance, current phase, frequency, etc.

SUMMARY OF THE INVENTION

It is one object of the present invention to provide an uninterrupted power supply system which allows the output power to be expanded. It is another object of the present invention to provide an uninterrupted power supply system which is an ON LINE design. It is still another object of the present invention to provide an uninterrupted power supply system which achieves high performance. It is still another object of the present invention to provide an uninterrupted power supply system which eliminates the installation of a transformer.

According to one aspect of the present invention the uninterrupted power supply system comprises a square wave oscillator having an output terminal, a square wave drive having an input terminal connected to the output terminal of the square wave oscillator and an output terminal, a negative wave drive having an input terminal connected to the output terminal of the square wave oscillator and an output terminal, a first bridge drive having two input terminals respectively connected to the output terminal of the square wave drive and the output terminal of the negative wave drive and an output terminal, a second bridge drive having two input terminals respectively connected to the output terminal of the square wave drive and the output terminal of the negative wave drive and an output terminal, a bridge circuit having a first input terminal connected to the output terminal of the first bridge drive, a second input terminal connected to the output terminal of the second bridge drive, a third input terminal and an output terminal, a R/C low pass filter having an input terminal connected to the output terminal of the bridge circuit and an output terminal connected to a load, an overload protection circuit having an input terminal connected to the output terminal of the bridge circuit and an output terminal, a high-voltage generator having an input terminal connected to the output terminal of the overload protection circuit and an output terminal, a full-wave rectifier having an input terminal connected to the output terminal of the high-voltage generator and an output terminal connected to the third input terminal of the bridge circuit. According to another aspect of the present invention, the bridge circuit consists of pairs of oxide metal field effect transistors (insulated-gate semiconductors) respectively connected by bridging for the conversion of DC power supply into AC power supply. According to still another aspect of the present invention, the high-voltage generator and the bridge circuit are mounted on an expansion card so that the output power of the system can be expanded by installing additional expansion cards. According to still another aspect of the present invention, the R/C low pass filter is free from the interference of temperature and the operation of the bridge circuit, so that the output power of the system is stable.

DETAILED DESCRIPTION OF THE PREFERRED EMBODIMENT

Figure 1:
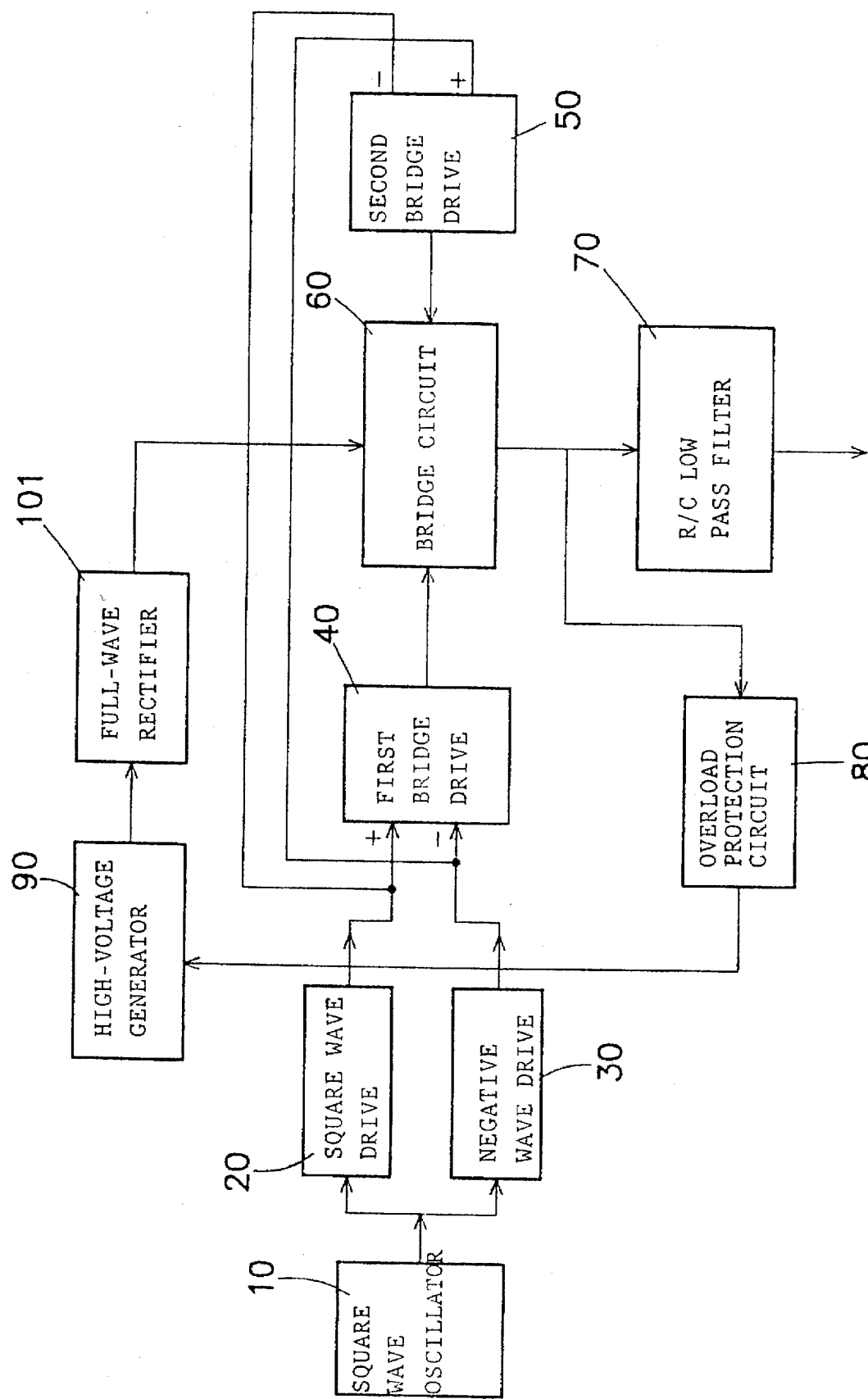
FIG. 1 is a circuit block diagram of an uninterrupted power supply system according to the present invention.

Referring to FIG. 1, an uninterrupted power supply system in accordance with the present invention is generally comprised of a square wave oscillator 10 having an output terminal; a square wave drive 20 having an input terminal connected to the output terminal of the square wave oscillator 10 and an output terminal; a negative wave drive 30 having an input terminal connected to the output terminal of the square wave oscillator 10 and an output terminal; a first bridge drive 40 having two input terminals respectively connected to the output terminal of the square wave drive 20 and the output terminal of the negative wave drive 30 and an output terminal; a second bridge drive 50 having two input terminals respectively connected to the output terminal of the square wave drive 20 and the output terminal of the negative wave drive 30 and an output terminal; a bridge circuit 60 having a first input terminal connected to the output terminal of the first bridge drive 40, a second input terminal connected to the output terminal of the second bridge drive 50, a third input terminal, and an output terminal; a R/C low pass filter 70 having an input terminal connected to the output terminal of the bridge circuit 60; an overload protection circuit 80 having an input terminal connected to the output terminal of the bridge circuit 60 and an output terminal; a high-voltage generator 90 having an input terminal connected to the output terminal of the overload protection circuit 80 and an output terminal; a full-wave rectifier 101 having an input terminal connected to the output terminal of the high-voltage generator 90 and an output terminal connected to the third input terminal of the bridge circuit 60.

Figure 2:
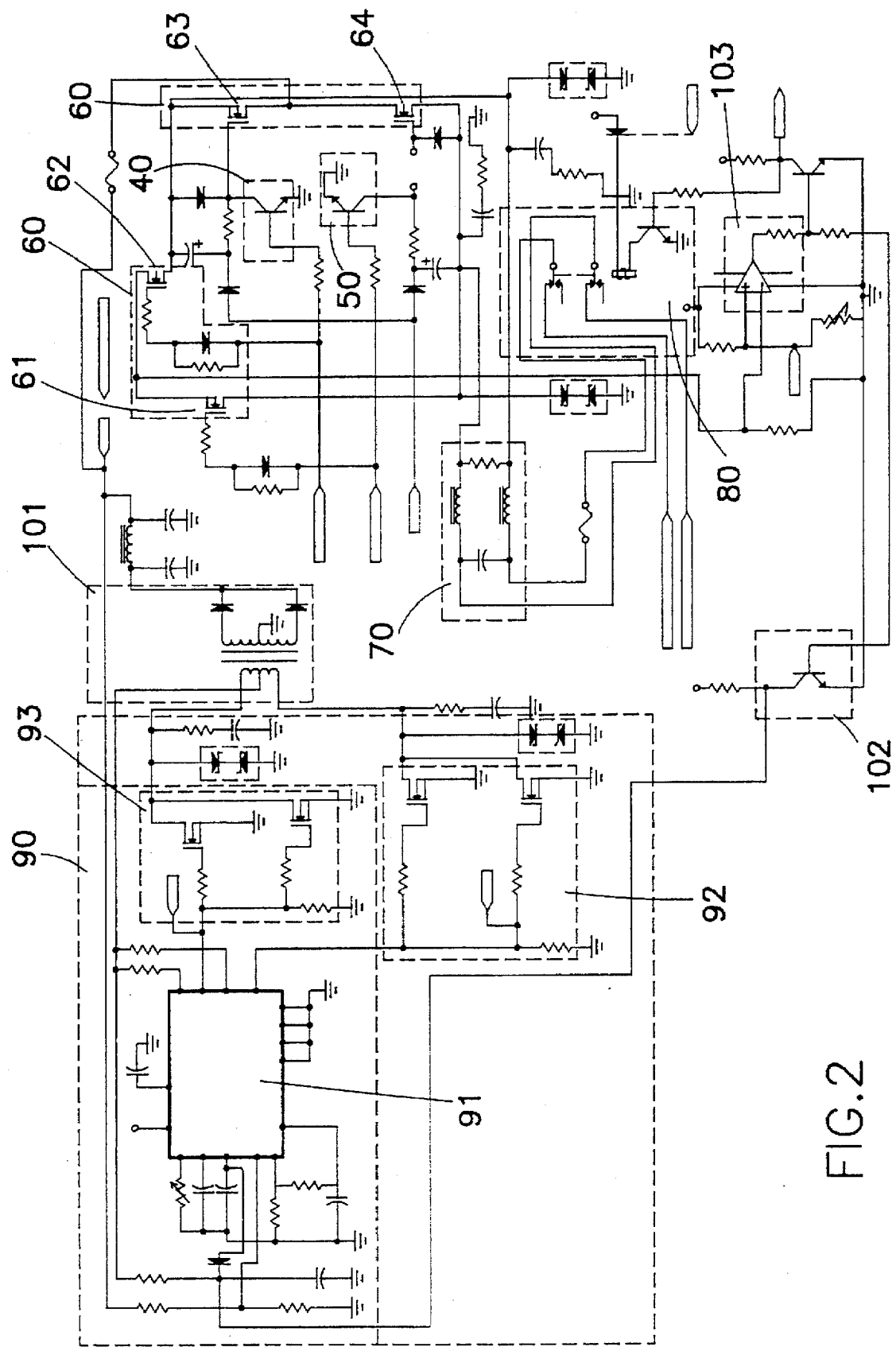
FIG. 2 is a detailed circuit diagram of the uninterrupted power supply system according to the present invention.
Figure 3:
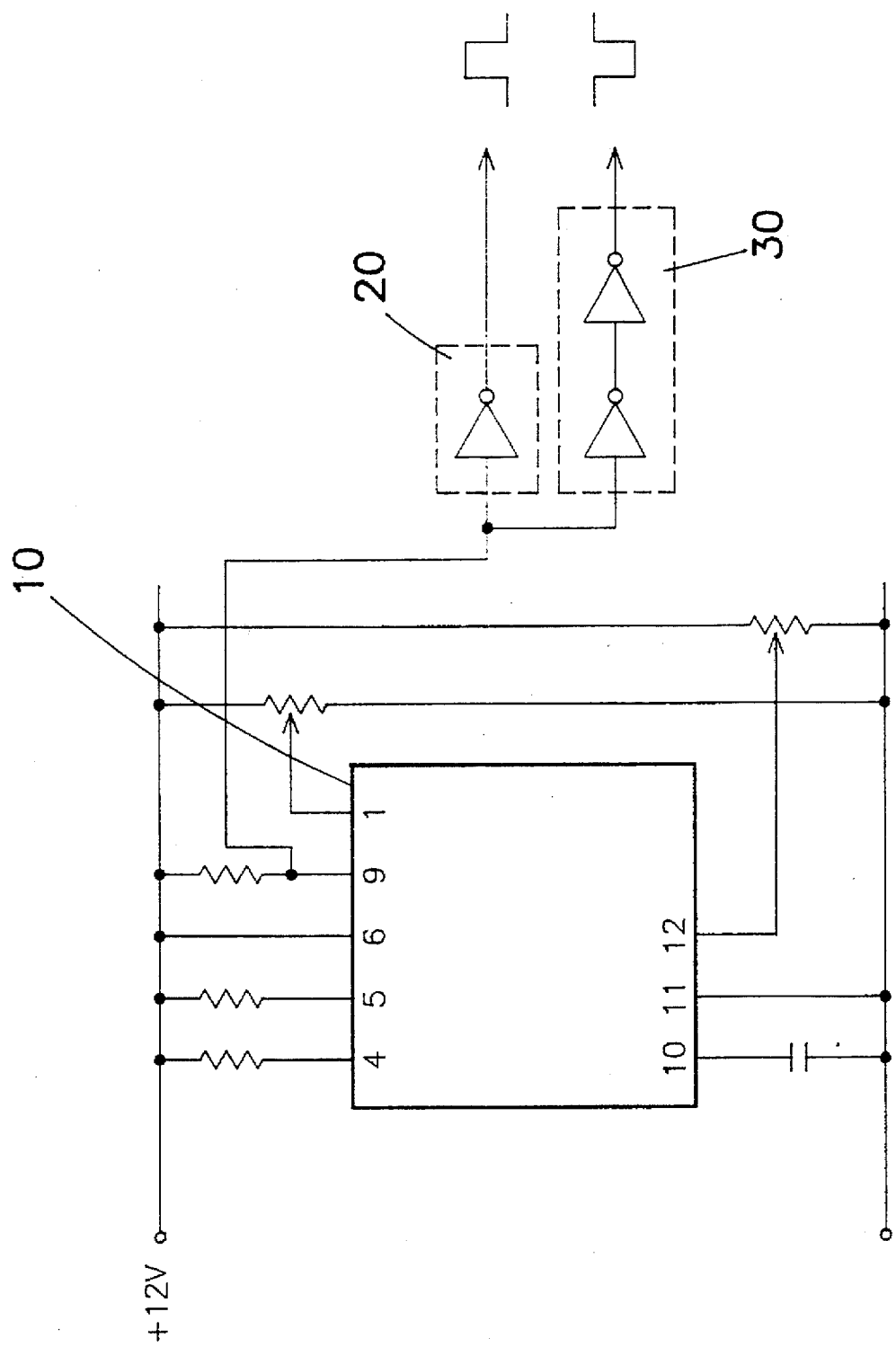
FIG. 3 is a circuit diagram of the square wave oscillator according to the present invention.

Referring to FIGS. 2 and 3, and FIG. 1 again, the square wave oscillator 10 provides a square wave signal, which is sent through the square wave drive 20 and the negative wave drive 30 to the first bridge drive 40 and the second bridge drive 50, causing the first bridge drive 40 and the second bridge drive 50 to turn on the bridge circuit 60. The bridge circuit 60 is comprised of pairs of oxide metal field effect transistors 61, 62, 63 and 64 connected by bridging. When a square wave is inputted into the first bridge drive 40, the field effect transistors 61, 62 are electrically connected, and the field effect transistors 63, 64 are electrically disconnected; when a negative wave is inputted into the second bridge drive 50, the field effect transistors 63, 64 are electrically connected, and the field effect transistors 61, 62 are electrically disconnected. Therefore, the alternating AC power supply is achieved.

The high-voltage generator 90 provides the necessary high voltage to the bridge circuit 60. The high-voltage generator 90 is comprised of a high-voltage processing circuit 91, a first field effect transistor drive 92, and a second field effect transistor drive 93. When 24 V DC power supply is inputted into the high-voltage generator 90, it is processed through the high-voltage processing circuit 91, then driven through the first field effect transistor drive 92 and the second field effect transistor drive 93, and then sent to the full-wave rectifier 101. After rectification through the full-wave rectifier 101, DC power supply is increased to 170 V (about 3A) and then sent to the R/C low pass filter 70 through the bridge circuit 60. The R/C low pass filter 70 changes square wave to approximately equal to sine wave, and therefore 120 V AC power supply is obtained at the output terminal of the R/C low pass filter 70. The overload protection circuit 80 is comprised of a relay. When the bridge circuit 60 produces an overload output, a negative feedback is provided from the high-voltage processing circuit 91 to an amplifier 103 through a buffer transistor 102, and then sent to the relay of the overload protection circuit 80, causing it to trip to off, and therefore the circuit is protected. Further, the square wave oscillator 10 is free from the interference of temperature and the operation of the R/C low pass filter 70. Therefore, the output power AC120 V/60 Hz) of the system is stable.

Figure 4:
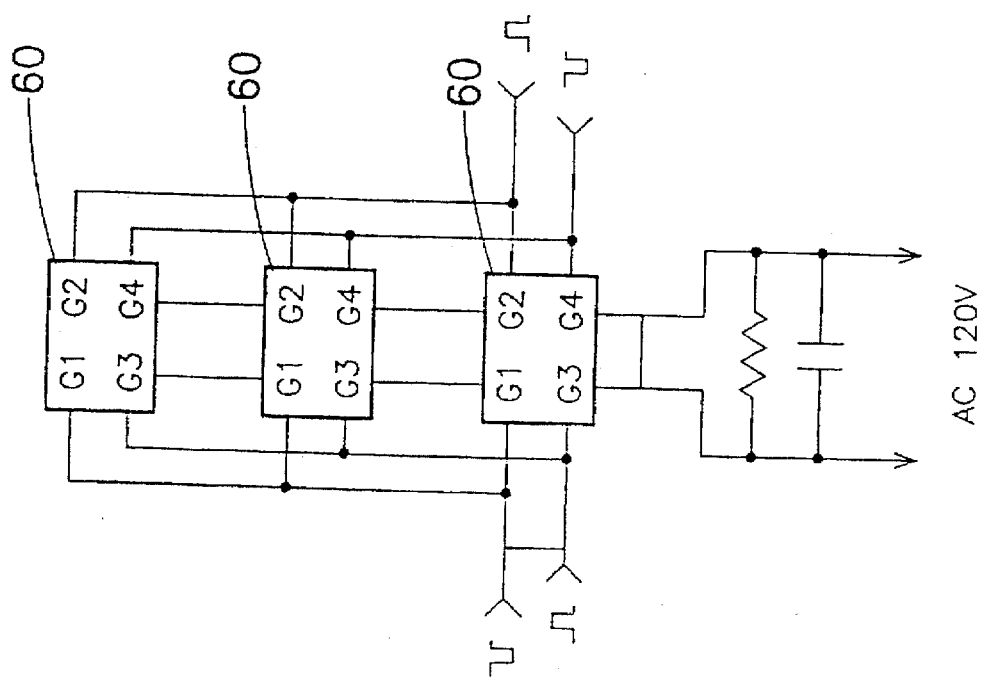
FIG. 4 is a block diagram showing a number of bridge circuits connected in parallel according to the present invention.
Figure 5:
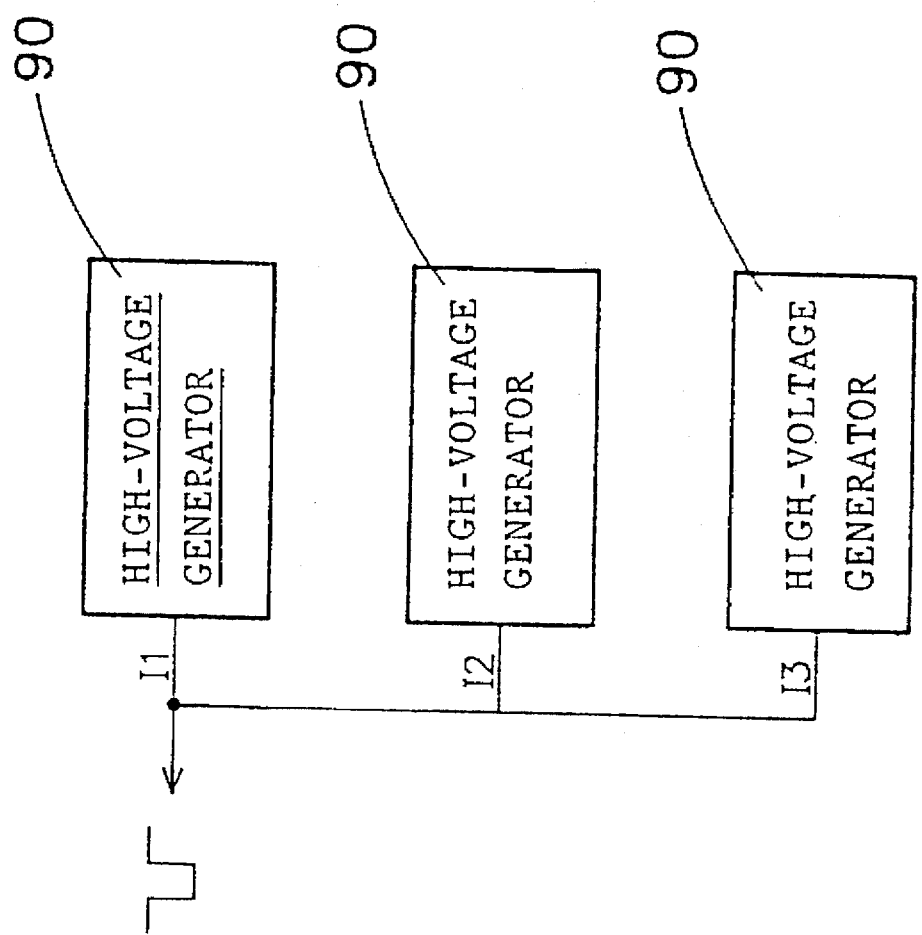
FIG. 5 is a block diagram showing a number of high-voltage generators connected in parallel according to the present invention.
Figure 6:
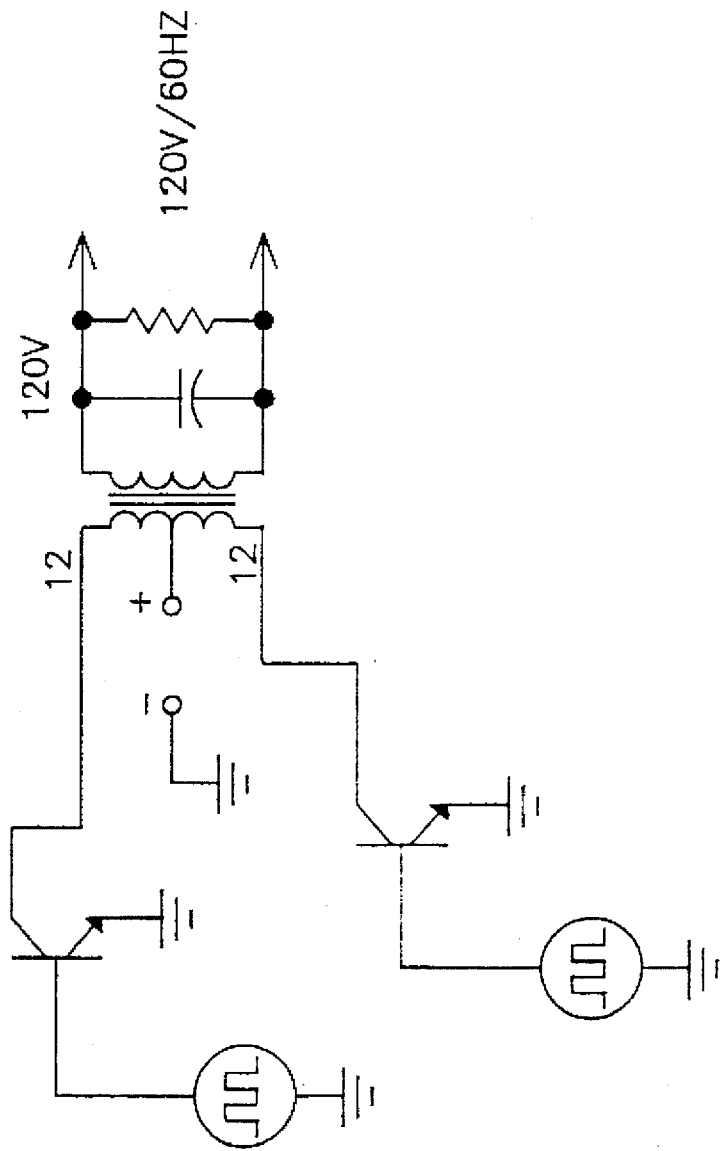
FIG. 6 is a circuit diagram of a transformer according to the prior art.

Referring to FIGS. 4 and 5, a number of bridge circuits 60 and a number of high-voltage generators 90 can be respectively connected in parallel to the R/C low pass filter 70 to increase output power. The bridge circuit 60 and the high-voltage generator 90 can be mounted on a common expansion card. When two or more expansion cards are installed, the output power of the uninterrupted power supply system is relatively increased. When an additional expansion card is added to the uninterrupted power supply system, the output power of the system is increased by 200WVA. When ten expansion cards are added to the uninterrupted power supply system, the output power of the system is increased by 2000WVA.

It is to be understood that the drawings are designed for purposes of illustration only, and are not intended as a definition of the limits and scope of the invention disclosed.

What the invention claimed is:

1. An uninterrupted power supply system comprising:
  a square wave oscillator having an output terminal;
  a square wave drive having an input terminal connected to the output terminal of said square wave oscillator and an output terminal;
  a negative wave drive having an input terminal connected to the output terminal of said square wave oscillator and an output terminal;
  a first bridge drive having two input terminals respectively connected to the output terminal of said square wave drive and the output terminal of said negative wave drive and an output terminal;
  a second bridge drive having two input terminals respectively connected to the output terminal of said square wave drive and the output terminal of said negative wave drive and an output terminal;
  a bridge circuit having a first input terminal connected to the output terminal of said first bridge drive, a second input terminal connected to the output terminal of said second bridge drive, a third input terminal, and an output terminal;
  a R/C low pass filter having an input terminal connected to the output terminal of said bridge circuit and an output terminal connected to a load;
  an overload protection circuit having an input terminal connected to the output terminal of said bridge circuit and an output terminal;
  a high voltage generator having an input terminal connected to the output terminal of said overload protection circuit and an output terminal; and
  a full-wave rectifier having an input terminal connected to the output terminal of said high-voltage generator and an output terminal connected to the third input terminal of said bridge circuit.

2. The uninterrupted power supply system of claim 1, wherein said bridge circuit comprising multiple pairs of oxide metal field effect transistors respectively connected by bridging.

3. The uninterrupted power supply system of claim 1, wherein said square wave oscillator providing a square wave signal, which is transmitted by said square wave drive and said negative wave drive to said first bridge drive and said second bridge drive to operate said bridge circuit.

4. The uninterrupted power supply system of claim 1, wherein
  said high-voltage generator comprising a high-voltage processing circuit, a first field effect transistor drive, and a second field effect transistor drive;
  said full-wave rectifier rectifying DC power supply from said high-voltage processing circuit through said first field effect transistor drive and said second field effect transistor drive, and then sending rectified DC power supply to said R/C low pass filter through said bridge circuit, so that AC power supply is obtained from the output terminal of said R/C low pass filter.

5. The uninterrupted power supply system of claim 1, wherein
  said overload protection circuit having a relay;
  said high-voltage processing circuit of said high-voltage generator providing a negative feedback when said bridge circuit provides an overload output, then sending the overload output through an amplifier via a buffer transistor, and then sending the overload output is to the relay of said overload protection circuit, causing said relay to trip off.

6. The uninterrupted power supply system of claim 1, wherein said square wave oscillator is free from the interference of temperature and the operation of said R/C low pass filter.

7. The uninterrupted power supply system of claim 1, wherein said high-voltage generator and said bridge circuit are mounted on an expansion card.

8. The uninterrupted power supply system of claim 1, wherein said square wave oscillator is an integrated circuit.

9. An uninterruptible power supply system comprising:

a square wave generator consisting of
- at least one resistor,
- at least one capacitor,
- a square wave oscillator consisting of an integrated circuit and having two output terminals,
- a square wave drive having two output terminals and an input terminal connected to one output terminal of said square wave oscillator, and
- a negative wave drive having two output terminals and an input terminal connected to the other output terminal of said square wave oscillator;

a first bridge drive having an output terminal and two input terminals connected respectively to one output terminal of said square wave drive and one output terminal of said negative wave drive;

a second bridge drive having an output terminal and two input terminals connected respectively to the other output terminal of said square wave drive and the other output terminal of said negative wave drive;

a bridge circuit having
- a first input terminal connected to the output terminal of said first bridge drive,
- a second input terminal connected to the output terminal of said second bridge drive,
- a third input terminal, and
- two output terminals,
- said bridge circuit containing four field effect transistors and a plurality of resistors, capacitors, and diodes;

a R/C low pass filter having an input terminal connected to one output terminal of said bridge circuit and an output terminal connected to an external load;

an overload circuit having an output terminal and an input terminal connected to the other output terminal of said bridge circuit;

a high-voltage generator having and output terminal and an input terminal connected to the output terminal of said overload protection circuit; and a full-wave rectifier having an input terminal connected to the output terminal of said high-voltage generator and an output terminal connected to the third input terminal of said bridge circuit.

* * * * *